United States Patent Office 3,096,307
Patented July 2, 1963

3,096,307
DIHYDROXY DIAMINE INITIATORS FOR THE POLYMERIZATION OF FORMALDEHYDE
Henri Sidi, Paramus, N.J., assignor to Heyden Newport Chemical Corporation, New York, N.Y., a corporation of Delaware
No Drawing. Filed Feb. 13, 1961, Ser. No. 88,656
12 Claims. (Cl. 260—67)

This invention relates to a process for the preparation of tough, high molecular weight polymers of formaldehyde. More particularly it relates to the use of certain dihydroxydiamines as polymerization initiators in the preparation of these polymers of formaldehyde.

It is known that formaldehyde can be polymerized in the presence of such initiators as metal salts, phosphines, arsines, stilbenes, and certain monoamines to form tough, high molecular weight polyoxymethylene which can be used in the preparation of films, fibers, filaments, and molding compounds. It has now been found that another class of compounds can be used in the preparation of these formaldehyde polymers.

In accordance with the present invention, substantially anhydrous monomer formaldehyde is contacted with the novel polymerization initiator and allowed to polymerize to high molecular weight polyoxymethylene.

The novel polymerization initiators that are employed in this process are dihydroxy allo-ocimene diamines and the hydrogenated derivatives of these diamines. More specifically, the compounds which have proven effective as polymerization initiators for formaldehyde are allo-ocimene derivatives which contain two hydroxyl groups and two primary, secondary, or tertiary amine groups These compounds have the formula

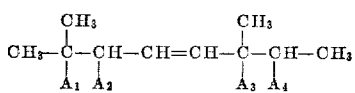

or the formula

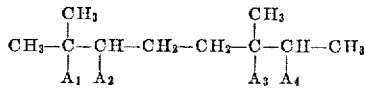

In each of these formulas two of the substituents $A_1$, $A_2$, $A_3$, and $A_4$ are hydroxyl groups; the other two are amino or alkylamino groups. In these compounds the combination of $A_1$ and $A_2$ contains one hydroxyl group and one nitrogen-containing group as does the combination of $A_3$ and $A_4$. The alkylamino groups may contain either one or two alkyl groups having from 1 to 4 carbon atoms and preferably 1 or 2 carbon atoms. The two nitrogen-containing groups in each compound need not be identical, but they usually are. A single dihydroxy diamine or a mixture containing two or more of these compounds may be used in the practice of the present invention.

Illustrative of the unsaturated dihydroxy diamines that may be used as formaldehyde polymerization initiators are diamino dihydroxy allo-ocimene, bis (monomethylamino) dihydroxy allo-ocimene, bis (dimethylamino) dihydroxy allo-ocimene, bis (monoethylamino) dihydroxy allo-ocimene, bis (diethylamino) hydroxy allo-ocimene, bis (diisopropylamino) dihydroxy allo-ocimene, bis (monobutylamino) dihydroxy allo-ocimene, and bis (dibutylamino) dihydroxy allo-ocimene. Illustrative of the saturated compounds are diamino dihydroxy-2,6-dimethyloctane, bis (monomethylamino) dihydroxy-2,6-dimethyloctane, bis (dimethylamino) dihydroxy-2,6-dimethyloctane, bis (monoethylamino) dihydroxy-2,6-dimethyloctane, bis (diethylamino) dihydroxy-2,6-dimethyloctane, and the like.

The unsaturated dihydroxy diamines may be prepared by the reaction of allo-ocimene dioxide with ammonia or with an appropriate primary or secondray amine at a temperature between approximately 10° and 120° C. Hydrogenation of these compounds in the presence of a standard hydrogenation catalyst yields the corresponding saturated dihydroxydiamines. The preparation of both the unsaturated and the saturated dihydroxydiamines is described in greater detail in copending application Serial No. 18,262, filed by Henri Sidi and William M. Kraft on March 29, 1960.

The amount of the initiator that is used is generally between about 0.00001 part and 0.05 part and preferably between about 0.0001 part and 0.005 part by weight per part by weight of formaldehyde.

The polymerization reaction may be carried out in the presence or in the absence of a liquid reaction medium or in a vapor phase reaction. It is preferably carried out in a substantially anhydrous organic medium which remains liquid under the conditions chosen for the reaction, which is inert to formaldehyde and to the polymerization initiator, and which is a non-solvent for polyoxymethylene. Suitable reaction media include hydrocarbons, ethers, and the like. The preferred media are the hydrocarbons which contain from 3 to 10 carbon atoms, such as propane, hexane, octane, decane, cyclohexane, benzene, xylene, and decahydronaphthalene.

The amount of the reaction medium used is not critical but may be within the range of about 1 to 1000 parts by weight per part by weight of formaldehyde. In most cases about 1 to 150 parts by weight of the medium is used for each part of formaldehyde.

The polymerization may be carried out in any convenient manner. For example, anhydrous monomeric formaldehyde may be introduced into a reactor containing a reaction medium and the polymerization initiator. Alternatively, the polymerization may be carried out by introducing formaldehyde continuously into a reactor containing the reaction medium and at the same time adding the polymerization initiator at such a rate that the temperature is maintained within the range chosen for the reaction. When the polymerization is complete, the product is recovered and dried.

The conditions under which the formaldehyde is polymerized are not critical. The polymerization is generally effected at a temperature between about −100° C. and 80° C. and preferably between about 0° C. and 40° C. While subatmospheric and superatmospheric pressures may be employed, the reaction in most cases takes place under atmospheric pressure.

The formaldehyde monomer that is used as the starting material in the process of this invention may be derived from any convenient source. For example, it may be obtained by pyrolysis of paraformaldehyde, α-polyoxymethylene, or a hemiformal. In order to obtain the desired tough, high molecular weight product, it is necessary that the formaldehyde monomer used in the polymerization be substantially anhydrous, that is, that it contain less than 0.5% and preferably less than 0.1% by weight of water.

The formation of tough, high molecular weight polyoxymethylene is best effected under non-oxidizing conditions. A convenient way of obtaining such conditions involves sweeping the reactor with a dry inert gas, such as nitrogen, and then carrying out the reaction under a blanket of the inert gas. In addition an antioxidant may be present in the reaction medium or may be added to the product to reduce oxidative effects. Among the antioxidants that may be used for this purpose are phenothiazine, 2-mercaptobenzimidazole, diphenylamine, phenyl-α-naphthylamine, bis(β-naphthylamino)-p-phenylene diamine, and 5-ethyl-10,10-diphenylphenazasiline. The amount of antioxidant used is generally about 0.01% to about 1% based on the weight of the formaldehyde.

The following examples will illustrate the manner in which the present invention may be practiced. It is to be understood, however, that these examples are not to be construed as being limitative but are furnished merely for purposes of illustration.

*Example 1*

Five hundred and twenty grams of cyclohexanol hemiformal which contained 23.3% of formaldehyde was pyrolyzed at 125°–147° C. over a period of approximately 2 hours. The formaldehyde vapors from the pyrolysis were passed through a series of traps, the first of which was maintained at room temperature, the second at 0° C., and the third and fourth at −10 to −20° C. The anhydrous monomeric formaldehyde thus produced was introduced along with a stream of dry nitrogen into a polymerization reactor which contained 1500 ml. of cyclohexane, 0.078 gram of bis(dimethylamino) dihydroxy allo-ocimene, and 0.1 gram of bis(β-naphthylamino)-p-phenylene diamine. The reaction mixture was stirred vigorously during the addition of the formaldehyde. The polymerization was carried out at 25°–30° C. in a nitrogen atmosphere. When the polymerization had been completed, the reaction mixture was filtered. The solid product was washed with 300 ml. of cyclohexane and dried at 65° C. to constant weight. The dried product, which weighed 62.5 grams, may be compression molded, for example, at 180° C. for 2 minutes, to produce tough molded objects.

*Example 2*

Anhydrous monomeric formaldehyde was prepared by heating a suspension of 100 grams of α-polyoxymethylene in 400 ml. of paraffin oil at 115°–150° C. The formaldehyde vapors from the pyrolysis were passed through a series of traps, the first of which was maintained at room temperature, the second at 0° C., and the third and fourth at −25° C. The resulting anhydrous monomeric formaldehyde was introduced along with a stream of dry nitrogen into a reactor containing 1500 ml. of benzene, 0.1 gram of phenothiazine, and 0.1 gram of bis(monoethylamino) dihydroxy allo-ocimene. The reaction medium was agitated and maintained at 25°–30° C. during the 80 minute reaction period. When the polymerization had been completed, the resulting slurry was filtered. The product was washed with 300 ml. of benzene and dried under vacuum at 65° C. to constant weight. The product, which weighed 62.5 grams, may be compression molded to produce tough molded objects.

Each of the other dihydroxy diamines that have been disclosed herein may be employed in a similar manner to initiate the polymerization of formaldehyde to form tough, high molecular weight polyoxymethylene.

Formaldehyde polymers prepared in accordance with this invention may be converted by melt extrusion, injection molding, compression molding, and other fabrication methods to films, fibers, molded articles, and the like.

I claim:
1. A process for the production of high molecular weight polyoxymethylene which comprises contacting substantially anhydrous monomeric formaldehyde at a temperature in the range of approximately −100° C. to 80° C. with a polymerization initiator selected from the group consisting of

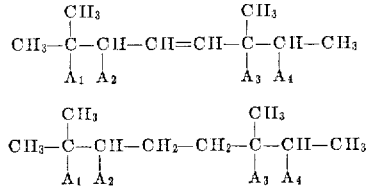

and mixtures thereof where in each case two of the substituents $A_1$, $A_2$, $A_3$, and $A_4$ represent hydroxyl groups and the other two of said substituents represent nitrogen-containing groups selected from the group consisting of amino and alkylamino groups, said alkylamino group containing at least one alkyl group having from 1 to 4 carbon atoms, and where the combination of $A_1$ and $A_2$ and the combination of $A_3$ and $A_4$ each contain one hydroxyl group and one nitrogen-containing group, said polymerization initiator being present in the amount of about 0.00001 part to 0.05 part by weight per part by weight of said formaldehyde, and recovering a high molecular weight polyoxymethylene.

2. The process of claim 1 in which the polymerization initiator is a bis (alkylamino) dihydroxy allo-ocimene.

3. The process of claim 1 in which the polymerization initiator is bis (dimethylamino) dihydroxy allo-ocimene.

4. The process of claim 1 in which the polymerization initiator is bis (monomethylamino) dihydroxy allo-ocimene.

5. The process of claim 1 in which the polymerization initiator is diamino dihydroxy allo-ocimene.

6. The process of claim 1 in which the polymerization initiator is a bis (alkylamino) dihydroxy-2,6-dimethyloctane.

7. The process of claim 1 in which the polymerization initiator is bis (dimethylamino) dihydroxy-2,6-dimethyloctane.

8. The process for the production of high molecular weight polyoxymethylene which comprises introducing substantially anhydrous monomeric formaldehyde into a reaction medium maintained at −100° to 80° C., said medium comprising a liquid hydrocarbon containing 3 to 10 carbon atoms per molecule and a polymerization initiator, said polymerization initiator being a member selected from the group consisting of

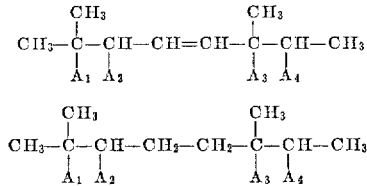

and mixtures thereof where in each case two of the substituents $A_1$, $A_2$, $A_3$, and $A_4$ represent hydroxyl groups and the other two of said substituents represent nitrogen-containing groups selected from the group consisting of amino and alkylamino groups, said alkylamino group containing at least one alkyl group having from 1 to 4 carbon atoms, and where the combination of $A_1$ and $A_2$ and the combination of $A_3$ and $A_4$ each contain one hydroxyl group and one nitrogen-containing group, said polymerization initiator being present in the amount of about 0.00001 part to 0.05 part by weight per part by weight of said formaldehyde, and recovering high molecular weight polyoxymethylene.

9. The process for the production of high molecular weight polyoxymethylene which comprises introducing substantially anhydrous monomeric formaldehyde into a reaction medium maintained at 0° to 40° C., said reaction medium comprising a liquid hydrocarbon containing 3 to 10 carbon atoms per molecule, a bis (alkylamino) dihydroxy allo-ocimene in an amount sufficient to initiate polymerization of the formaldehyde, and an antioxidant and recovering high molecular weight polyoxymethylene.

10. The process of claim 9 wherein the polymerization initiator is bis (dimethylamino) dihydroxy allo-ocimene.

11. The process of claim 9 wherein the polymerization initiator is bis (monomethylamino) dihydroxy allo-ocimene.

12. The process of claim 9 wherein the hydrocarbon reaction medium is present in the amount of 1 to 150 parts by weight per part by weight of formaldehyde and the polymerization initiator is present in the amount of about 0.0001 part to 0.005 part by weight per part by weight of formaldehyde.

References Cited in the file of this patent
UNITED STATES PATENTS 2,841,570     MacDonald _____ July 1, 1958

UNITED STATES PATENT OFFICE

CERTIFICATE OF CORRECTION

Patent No. 3,096,307 July 2, 1963

Henri Sidi

It is hereby certified that error appears in the above numbered patent requiring correction and that the said Letters Patent should read as corrected below.

Column 3, line 59, for "bis(monoethyl-" read -- bis(monomethyl- --.

Signed and sealed this 7th day of January 1964.

(SEAL)
Attest:

ERNEST W. SWIDER
Attesting Officer

EDWIN L. REYNOLDS

Acting Commissioner of Patents